W. C. BUSSEY.
Car Coupling.
No. 5,194.    Patented July 17, 1847.
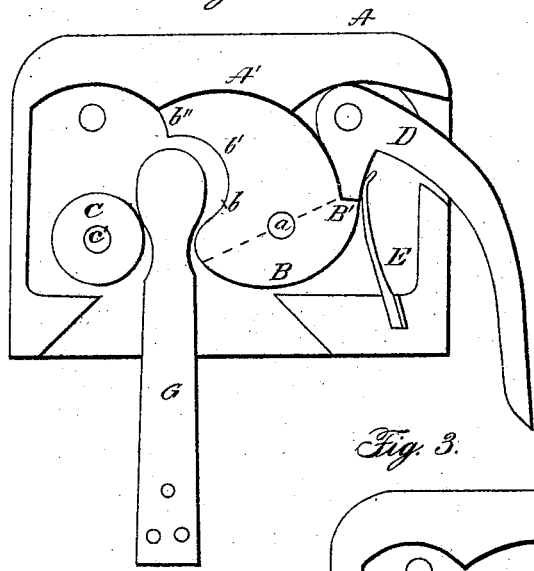
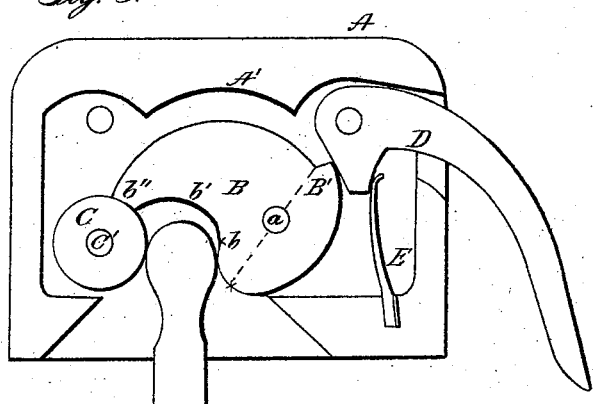
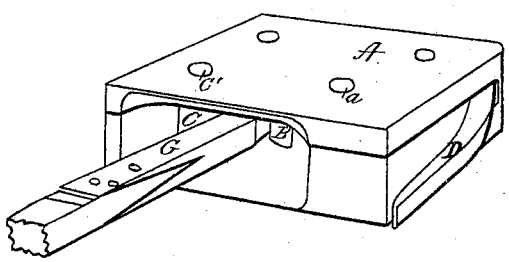
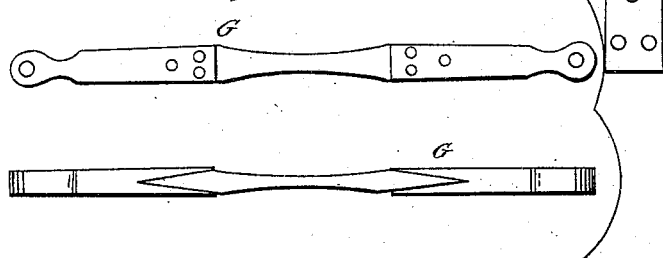

UNITED STATES PATENT OFFICE.

WM. C. BUSSEY, OF ROCK GROVE, ILLINOIS.

COUPLING FOR CARS.

Specification of Letters Patent No. 5,194, dated July 17, 1847.

*To all whom it may concern:*

Be it known that I, WILLIAM C. BUSSEY, of Rock Grove, in the county of Stephenson and State of Illinois, have invented a new and useful Coupling for Railroad-Cars and other Purposes, which is described as follows, reference being had to the annexed drawings of the same, making part of this specification.

The nature of this invention and improvement consists in combining and arranging within a suitable cast-iron box, (having an open flaring mouth) an eccentric notched tumbler—a roller and a dog turning on round pins inserted into the front and back plates of the box, and a spring or weight for holding the dog in gear with the tumbler arranged and operating in such manner that when a car, to which the coupling bar is attached, approaches a car to which the box is affixed, the head of the coupling bar enters the mouth of the box—passes between the roller and tumbler, strikes the tail of the tumbler, causes it to turn on its axis, and brings a convex protuberance thereon into the concavity of the coupling bar forming its neck, and at the same time the dog into the notch of the tumbler by the action of the spring, or by a weight, by which the coupling is effected—the said dog having an extended tail affixed to it, reaching through a mortise in the edge of the box for the purpose of striking against the appended car when the car to which the box is affixed may be suddenly thrown or turned from its track by which the dog becomes disengaged from the tumbler and the cars detached by the turning of the tumbler on its axis which allows the head of the coupling bar to pass freely from the box between the roller and tumbler; by which arrangement and operation, the apparatus becomes self-acting, there being provision made for a similar box and coupling apparatus on the appended car having the tail end of the dog extending through the box on the opposite side so that should the cars turn off the track on that side, the separation may take place in a similar manner to that above described—the box and all the parts contained in it being cast of iron or other suitable material except the spring which is made of good cast steel—the two boxes and their contained coupling and uncoupling apparatus for each coupling bar being made in a similar manner—and the coupling bars being made alike at both ends, namely each end having a head and neck formed thereon—for the purpose of connecting two adjacent cars, said coupling bars being made entirely of wood, or iron, or of both combined; and when made in the latter mode as represented at Figure 6 with the center piece of wood; this center piece may be notched at the middle so as to break at that point in case the coupling should not act on the running off of a car from the track.

Fig. 1 is a perspective view of the box, showing the tail end of the dog extending through the right end of the same. Fig. 2 is a plan of the apparatus in a connected position—the top plate of the apparatus being removed in order to show the parts within the box. Fig. 3 is a plan of the apparatus in a disconnected position the tail end of the dog having been struck and moved outward from the box at the same time disconnecting the dog from the tumbler leaving it at liberty to turn on its axis by the draft of the head of the coupling bar upon the protuberance of the tumbler. Fig. 4 is a top and side view of the coupling bar composed of wrought iron and wood.

A is the box cast in two pieces in the form represented in Figs. 1, 2, and 3, or in any other more suitable form, having a cavity A′ in one side of the interior the segment of a circle corresponding with the curvature of the back of the tail end of the eccentric tumbler which is to rest therein when the tumbler is driven back as far as it will go—also with a flaring mouth to admit the head of the link or coupling bar to enter the box freely, likewise with an opening in the side to allow the tail end of the dog to pass through and play freely therein, and with suitable apertures to admit the bolts which serve the triple purpose of confining the top of the box to the bottom thereof and the box to the car and also as axles to the dog tumbler, and roller.

B is the eccentric tumbler which is made of a concavo-convex form resembling the tumbler of a common gun lock—the radius of the curve line circumscribing its larger end gradually increasing from the notch B′ till it meets a straight line or chord dotted at *x x x x* drawn through the axis, and the notch at which point the radius begins to decrease till it reaches $b$ when its direction reverses to form the concavity of the tumbler, from the notch on the opposite side to this concavity it is made like the ordinary eccentric cam except the end $b''$ which is made concave to correspond with the convexity of the roller C against which it is arrested during the operation of turning it to withdraw the coupling said tumbler B being thus shaped, or formed, in order to form a space sufficiently large for the head of the coupling bar to pass through freely during the operation of disengaging it from the roller and tumbler, and likewise to narrow this space to the width of the neck of the coupling bar by turning the tumbler back against the concave side A′ of the box as represented in Fig. 2 which is effected by forcing the convex head of the bar G against the concave side $b'$ of the tumbler during the operation of coupling the cars causing the tumbler to turn on its axis $a$ and to bring the enlarged side of the tumbler into the cavity or neck of the coupling bar and the dog D into the notch B′ of the tumbler by which the coupling is rendered secure. The coupling bar is forced into the box and secured by the tumbler by the motion of the car to which the bar is attached, in approaching the car to which the box is affixed. The separation is effected by bearing the tail end of the dog from the box, which disengages the dog from the tumbler, and allows it to turn on its axis. As it may disengage itself without the interference of the attendant, or any one, by turning the car to which the box is affixed, suddenly to the right or to the left, so as to bring one or the other of the dogs D in contact with the cars, by which they become disengaged from the tumblers leaving the tumblers at liberty to turn by the draft of the coupling bars against their convex surfaces and the heads of the bars to pass out from between the rollers and the tumblers.

C is the roller, C′ its axis.

D is the dog for holding the tumbler. E is the spring for keeping the dog in gear with the tumbler.

G is the coupling bar made of wrought iron—or a combination of wood and wrought iron as represented in Fig. 4 which represents a wood core or central connecting piece embraced by iron plates having the ends of each plate shaped with a convex head and concave neck, and with or without holes for the admission of the ordinary vertical coupling bolt or bolts. The head of the bar G may also be made of a semi-oval shape in order to glance off toward its intended position when it strikes either of the four sloped sides of the mouth or entrance of the box.

The four sides of the mouth or entrance to the interior of the box A or space between the roller C and tumbler B should be sloped outwardly at an angle of about 45 degrees in order to guide the coupling bar to the space between the roller and eccentric tumbler should the head of the bar G first strike one of the sloped sides in bringing the cars together the periphery of the roller and the convex portion of the tumbler forming a continuation of the mouth.

The box A might be dispensed with altogether, having the axles of the tumbler roller and dog fixed in the car frame and inclined guides arranged in front of the cam and roller for conducting the bar to the space between them.

What I claim as my invention and desire to secure by Letters Patent is—

Coupling and uncoupling cars by means of an eccentric tumbler, revolving roller, turning dog and coupling bar constructed, arranged and operated substantially in the manner and for the purpose above set forth, the coupling being effected by the motion of the car.

WILLIAM C. BUSSEY.

Witnesses:
Wm. P. Elliot,
A. E. H. Johnson.